US012678715B2

(12) United States Patent
Salazar

(10) Patent No.: US 12,678,715 B2
(45) Date of Patent: Jul. 14, 2026

(54) PAINT SLUDGE SEPARATOR TANK USING FROTH FLOATATION

(71) Applicant: Giffin, Inc., Auburn Hills, MI (US)

(72) Inventor: Abraham J. Salazar, Lake Orion, MI (US)

(73) Assignee: GIFFIN, INC., Auburn Hills, MI (US)

( * ) Notice: Subject to any disclaimer, the term of this patent is extended or adjusted under 35 U.S.C. 154(b) by 348 days.

(21) Appl. No.: 18/368,500

(22) Filed: Sep. 14, 2023

(65) Prior Publication Data

US 2024/0091676 A1 Mar. 21, 2024

Related U.S. Application Data

(60) Provisional application No. 63/406,882, filed on Sep. 15, 2022.

(51) Int. Cl.
B01D 21/24 (2006.01)
B03D 1/24 (2006.01)

(52) U.S. Cl.
CPC ..... B01D 21/2488 (2013.01); B01D 21/2405 (2013.01); B03D 1/242 (2013.01)

(58) Field of Classification Search
CPC .. B03D 1/1462; B03D 1/242; B01D 21/2405; B01D 21/2488
See application file for complete search history.

(56) References Cited

U.S. PATENT DOCUMENTS

| | | | | |
|---|---|---|---|---|
| 4,368,060 A | * | 1/1983 | Yanagiako | ............. B01D 53/60 |
| | | | | 422/168 |
| 4,585,557 A | | 4/1986 | Turnquist | |
| 4,722,791 A | | 2/1988 | Turnquist | |

FOREIGN PATENT DOCUMENTS

| | | | | | |
|---|---|---|---|---|---|
| CN | | 2597477 Y | * | 1/2004 | ............ C12M 27/04 |
| CN | | 208465886 U | * | 2/2019 | |
| GB | | 1482368 A | * | 8/1977 | ........... B03D 1/1456 |

OTHER PUBLICATIONS

Zhang, Hua-dong et al—CN208465886U machine translation—Feb. 5, 2019 (Year: 2019).*
Zhu, Jin-hua—CN 2597477 Y machine translation—Jan. 7, 2004 (Year: 2004).*

* cited by examiner

*Primary Examiner* — Bradley R Spies
(74) *Attorney, Agent, or Firm* — Dickinson Wright PLLC

(57) ABSTRACT

A system includes a sparger and a gas supply for paint sludge separation in a tank containing a mixture of paint and liquid. The tank has an open upper end for moving paint sludge out of the tank. The sparger includes a gas inlet tube fluidically connected to an enclosure hood, the inlet tube projecting downwardly into the tank to a tube outlet. The enclosure hood has a closed upper end that radially encloses the tube outlet and extends downwardly to an open lower end to define an interior volume between the upper and lower ends. The lower end defines a peripheral rim with a diameter greater than a diameter of the enclosure hood at the closed upper end. The gas supply feeds the gas inlet tube of the sparger, and has a pressure that forms a gas pocket within the interior volume of the enclosure hood that extends from the tube outlet to the peripheral rim such that portions of the gas pocket pass over the peripheral rim and form gas bubbles which rise through the mixture towards the open upper end of the tank.

23 Claims, 16 Drawing Sheets

PAINT SLUDGE SEPARATOR TANK USING FROTH FLOATATION

CROSS-REFERENCE TO RELATED APPLICATIONS

This application claims the benefit of priority under 35 U.S.C. § 119 to U.S. Provisional Patent Application No. 63/406,882, filed Sep. 15, 2022, the contents of which are incorporated herein by reference in its entirety.

FIELD OF THE INVENTION

The present invention relates generally to paint sludge separation tanks, and more particularly relates to a system using froth flotation to enhance paint sludge separation.

BACKGROUND

Paint sludge separation is plagued by the dense and adhesive nature of paint. In paint sludge separation, the excess paint is typically washed away into a reservoir where paint sludge is concentrated by means of coagulation to facilitate removal. The concentrated paint sludge in the reservoir is pumped to a tank for further concentration and separation. Flocculants are typically used to cause the paint sludge to rise towards the top of a tank, whereupon a one or more scraping paddles (e.g. attached to an endless conveyor) are used to skim the paint sludge off the liquid, over the top edge and out of the tank. Examples in the prior art include U.S. Pat. Nos. 4,585,557 and 4,722,791. Surfactants may also be used to modify the surface tension in the tank to facilitate paint sludge separation.

Froth floatation is a process for selectively separating hydrophobic materials from hydrophilic ones. A bubble generator or sparger is used to create gas bubbles that attach to hydrophobic particles to lift them, while hydrophilic particles sink to the bottom of the separation tank. Froth flotation is typically used in mineral processing to separate minerals from a carrying liquid, and is also used in paper recycling, waste water treatment and coal beneficiation. While froth flotation is conceptually simple (i.e., it uses surface properties to separate valuable minerals from gangue), the multiphase, multiscale sub-processes involved are not fully understood.

In the past, froth floatation has not been used in sludge separation due to several reasons. First, the differences in material composition between paint and other materials such as minerals. For example, paint sludge contains a diversity of solids depending on the type of paint used and even on its color. Second, and more importantly, despite the use of detackifiers, paint sludge may still be relatively sticky. As a result, paint sludge will plug any holes it finds on its path through the separation system, preventing the effective use of bubblers typically used in froth flotation.

SUMMARY

The present disclosure may include any of the following aspects in various combinations and may also include any other aspect described below in the written description or in the attached drawings.

In a first aspect, a system having a sparger and a gas supply is provided for paint sludge separation in a tank defining a vertical axis and containing a mixture of paint and liquid. The tank has an open upper end for moving paint sludge out of the tank. The sparger includes a gas inlet tube fluidically connected to an enclosure hood, the inlet tube projecting downwardly into the tank to a tube outlet. The enclosure hood has a closed upper end that radially encloses the tube outlet and extends downwardly to an open lower end to define an interior volume between the upper and lower ends. The lower end defines a peripheral rim with a diameter greater than a diameter of the enclosure hood at the closed upper end. The gas supply feeds the gas inlet tube of the sparger, and has a pressure that forms a gas pocket within the interior volume of the enclosure hood that extends from the tube outlet to the peripheral rim such that portions of the gas pocket pass over the peripheral rim and form gas bubbles which rise through the mixture towards the open upper end of the tank.

According to further aspects, the enclosure hood preferably has a conical or frusto-conical shape. The peripheral rim may define a flat peripheral edge, or may be serrated to define a plurality of teeth. In the latter case, the teeth are shaped as at least one of sinusoidal, triangular, truncated triangular, rounded triangular, rectangular or any other serrated like shape. The peripheral rim may be separately formed and attached to the enclosure hood. The peripheral rim may be flared outwardly relative to an axis of the inlet tube, or may extend generally parallel to the vertical axis.

According to still further aspects, the enclosure hood may be rotatably mounted relative to the tank such that the hood can be rotated within the tank. Similarly, the inlet tube and enclosure hood may be rotatably mounted relative to the tank such that the inlet tube and hood can be rotated within the tank. An outer surface of the enclosure hood may include at least one stirring fin attached thereto and projecting into the tank. An outer surface of the inlet tube may include at least one stirring blade attached thereto and projecting into the tank In a second aspect, the tube outlet of the inlet tube is a first tube outlet, and the inlet tube includes a second tube outlet vertically above the first tube outlet. The sparger may include a second enclosure hood having a closed upper end that radially encloses the second tube outlet, the second enclosure hood extending downwardly to an open lower end to define an interior volume between the upper and lower ends, the lower end defining a peripheral rim with a diameter greater than a diameter of the second enclosure hood at its closed upper end. The pressure of the gas supply forms a second gas pocket within the interior volume of the second enclosure hood, the second gas pocket extending from the second tube outlet to the peripheral rim of the second enclosure hood such that portions of the second gas pocket pass over the peripheral rim and form gas bubbles which rise through the mixture towards the open upper end of the tank.

According to further aspects, the diameter of the peripheral rim of the second enclosure hood is preferably less than the diameter of the peripheral rim of the first enclosure hood. Additional tube outlets may be provided for additional enclosure hoods, the size of the enclosure hoods preferably decreasing as the hoods are located vertically above each other along the gas inlet tube.

According to still further aspects, the system may further include a mixer at least partially disposed in the tank, the mixer defining an interior space having mixer section and a diffusion section. The interior space communicates with a sludge inlet tube through which the mixture of paint and liquid is delivered to the mixer, and an outlet of the sludge inlet tube disposed in the mixer section of the mixer. The diffusion section is preferably positioned vertically above the mixer section. A cross-sectional area of the mixer section may vary along the vertical axis. The mixer section may include a mixer pocket in an area immediately adjacent the outlet of the sludge inlet tube, the mixer pocket having a greater cross-sectional area along its height than a cross-sectional area of the remainder of the mixer section. A bottom wall of the mixer may be curved, or may be flat and extend generally perpendicular to the vertical axis. The width of the mixer pocket may be equal to or less than the width of the remainder of the mixer section, and the depth of the mixer pocket may be equal to or greater than the depth of the remainder of the mixer section.

BRIEF DESCRIPTION OF THE DRAWINGS

The accompanying drawings incorporated in and forming a part of the specification illustrate several aspects of the present invention, and together with the description serve to explain the principles of the invention. In the drawings:

Figures 21A, 21B, 21C, 22A, 22B, 22C:
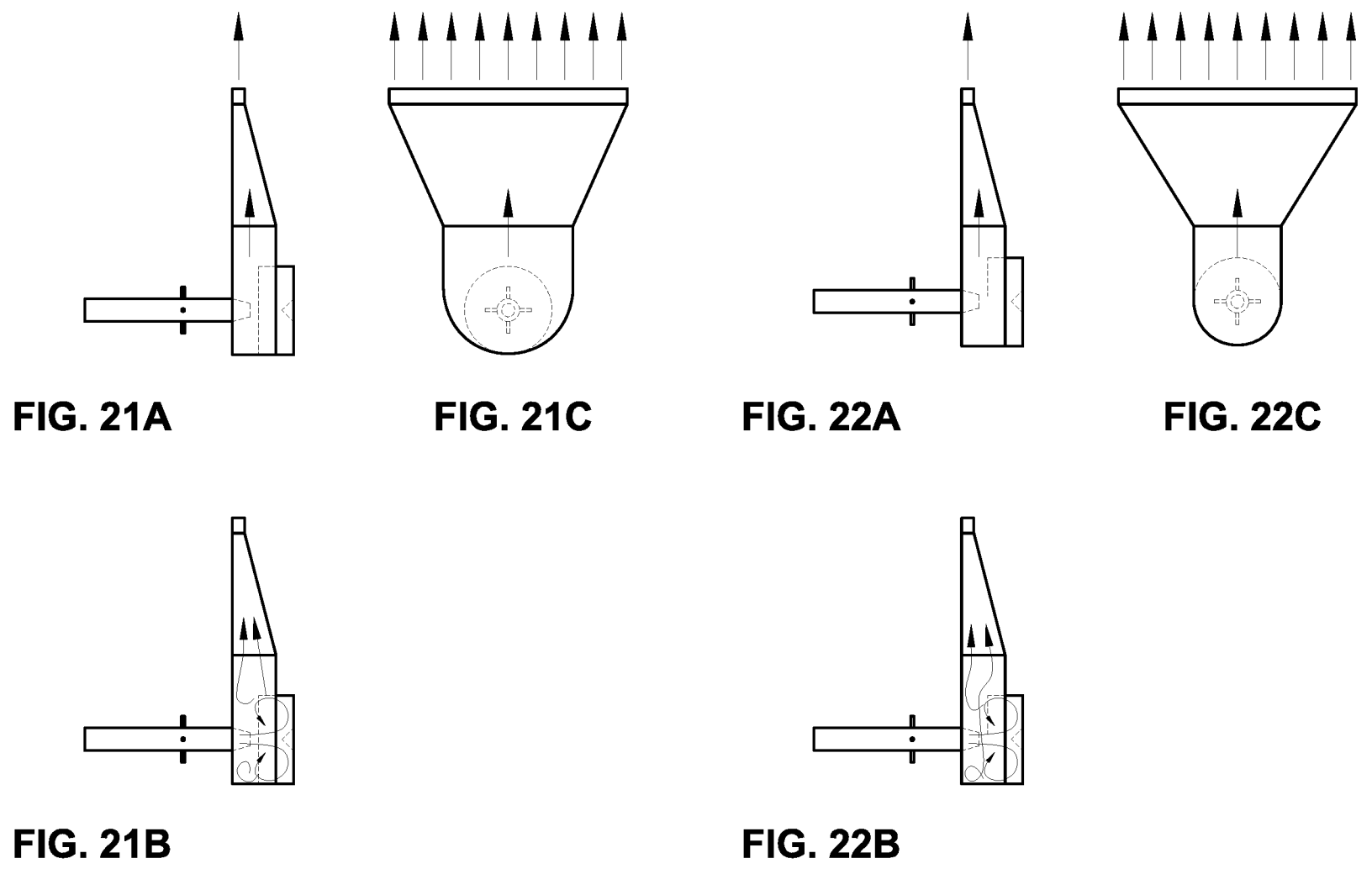

FIGS. 21A-21C are a side view, a cross-sectional side view, and a front view, respectively, of a fifth embodiment of a mixer for use in the system of FIGS. 1-3;

FIGS. 22A-22C are a side view, a cross-sectional side view, and a front view, respectively, of a sixth embodiment of a mixer for use in the system of FIGS. 1-3;

DETAILED DESCRIPTION

Figure 1:
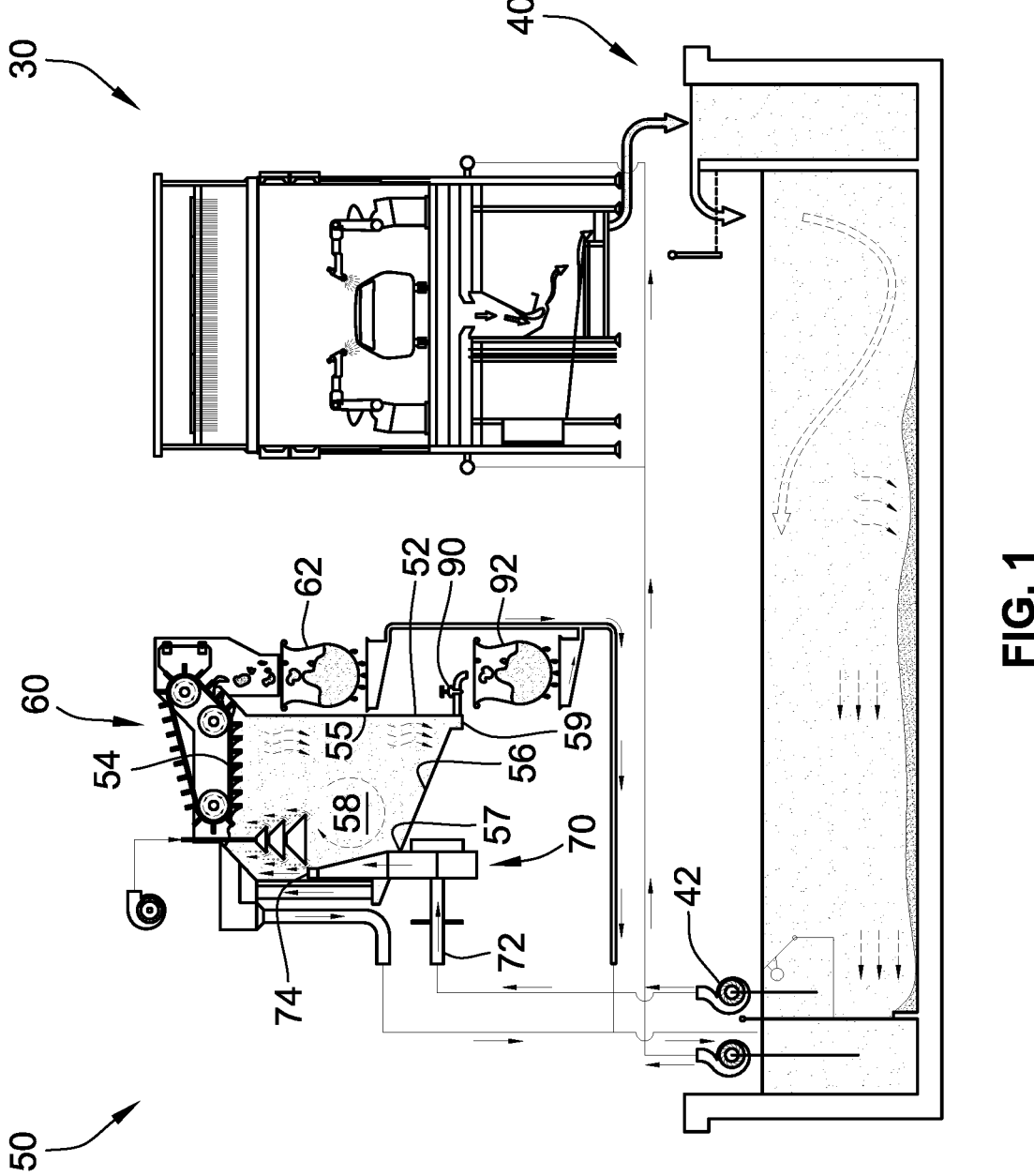
FIG. 1 is a system view of an embodiment of the paint sludge separator system and related environment, in accordance with the teachings of the present disclosure.

All figures serve illustrative purposes only and are not intended to limit the scope of the present invention. The drawings are generally to scale, but some features may not be true to scale and serve to emphasize certain details of the various aspects of the invention. The term 'generally', when used with dimensions or shapes, means that the specified dimension or shape is within +/−10%. Common items between different embodiments in the figures have common reference numerals.

Turning now to the figures, FIG. 1 depicts a system view of one common environment of a paint sludge separation system. Painting occurs in a paint booth 30, such as an automotive paint booth using robotic and/or manual painting. Excess paint that becomes overspray falls and/or is washed through openings in the floor into a bed of water, where the mixture of paint and liquid is moved into a settling tank 40. The paint and liquid partially separate in the settling tank, with some solids rising and others falling to the bottom of the settling tank. Preferably, the majority of the solids float within the tank. The first stage of paint sludge concentrated is achieved by means of floating and coagulating on the surface of the tank and separating from the rest of the water. A pump 42 is used to deliver this concentrated paint sludge from the upper portion of the settling tank 40 to the paint sludge separator 50, although the sludge could also be pumped from the bottom of the settling tank 40 as well.

Figure 3:
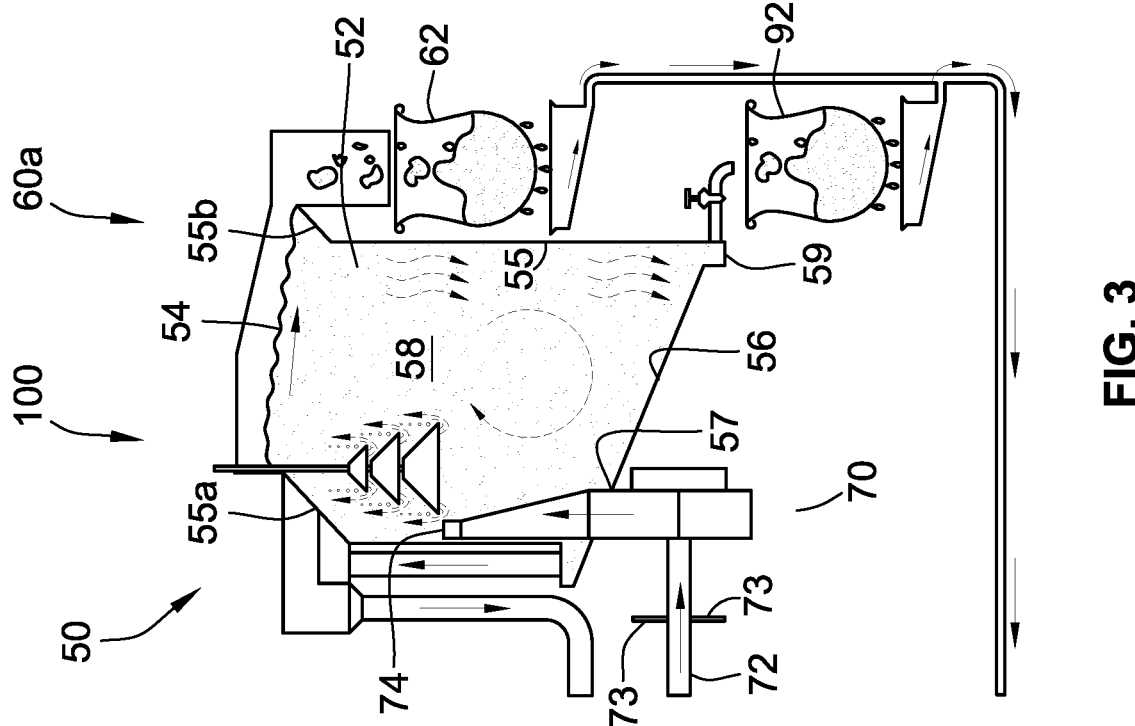
FIG. 3 is a side view of a second embodiment of the system.
Figure 2:
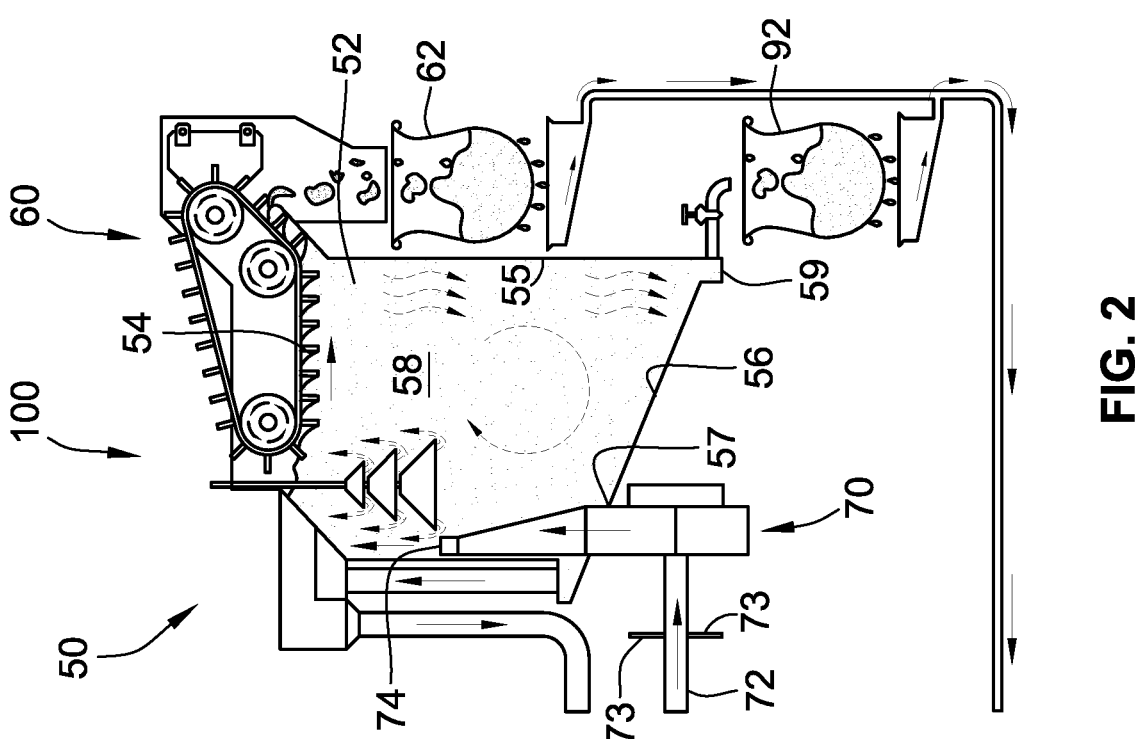
FIG. 2 is a side view of a first embodiment of the system.

The paint sludge separator 50 generally includes a tank 52 having an open upper end 54 through which sludge is removed and delivered to a decanter 62. Various strainers, filters and piping for removing excess water from the tank 52 and decanter 62 are shown in the system view of FIG. 1 and will be understood by the skilled artisan. The tank generally includes one or more side walls 55 closed at the bottom by a bottom wall 56, and in communication with the rest of tank 52, which collectively define the tank interior 58. In other embodiments, the tank 52 may be rounded such that some or all of the side walls 55 and/or bottom wall 56 form a contiguous surface. The bottom wall 56 of the tank 52 is also preferably slanted downwardly towards one side of the tank (e.g., to the right in FIGS. 1-3) so that paint sludge which settles at the bottom of the tank 52 can be removed via a bottom sludge outlet 59 which can be controlled via a valve 90 for collection in another decanter 92. As shown in FIG. 3, the open upper end 54 e.g. may be angled (relative to horizontal/ground) such that the floated paint sludge can naturally fall out of the tank 52 under gravity, or an assistive device such as the paddle conveyor 60 shown in FIG. 2 can be employed to facilitate removal of paint sludge via the open upper end 54 of the tank 52.

Returning to FIG. 1, wet sludge from the settling tank 40 is pumped to a mixer 70 via its sludge inlet pipe 72. The mixer 70 and different embodiments thereof will be discussed later herein with reference to FIGS. 17-24. As can be seen in FIG. 1, the mixer 70 is partially fitted within the tank interior 58 by having an upper portion fitted through a mixer opening 57 in the bottom wall 56 of the tank. Mixed paint sludge exits the mixer 70 at an upper end thereof via a mixer outlet 74. Preferably the mixer 70 and/or at least the mixer outlet 74 is located along a side wall 55 on the opposite side of where the sludge is removed from the open upper end 54 of the tank 52. The mixer facilitates froth floatation by mixing the incoming solid laden liquid with a flocculant, e.g. a surfactant that will enhance the creation of bubbles. Suitable flocculants and surfactants include organic synthetic and natural polymeric flocculants, and bioflocculants, as well as other chemical compositions as will be recognized by the skilled artisan.

As will be discussed further herein, the mixer 70 is preferably a static mixer with vortex generation to enhance mixing of the flocculants or other chemicals with the sludge. Vortices that are generated have a highly turbulent core that enhance mixing. A vortex generator is typically hard to clog because any debris that accumulates inside the mixer increases velocity, so the flow shears the debris away. In addition, to make sure all solids in the stream have the same chance to be floated, the mixture (liquid, solids and flocculant) must be delivered on a very uniform fashion across the tank.

The mixer 70 and especially its mixer outlet 74 are located adjacent a sparger 100. The sparger 100 is supplied with a stream a gas and forms bubbles which attach to hydrophobic particles, while hydrophilic particles sink to the bottom of the tank 52. That is, the sparger 100 is used to provide froth flotation for separation and removal of paint sludge exiting the mixer 70 inside the tank 52. A bottom end of the sparger 100 is preferably located within the tank interior 58 at a vertical position relatively adjacent the mixer outlet 74. The sparger 100 and various embodiments thereof will be described with reference to FIGS. 4-13.

Figures 4, 5:
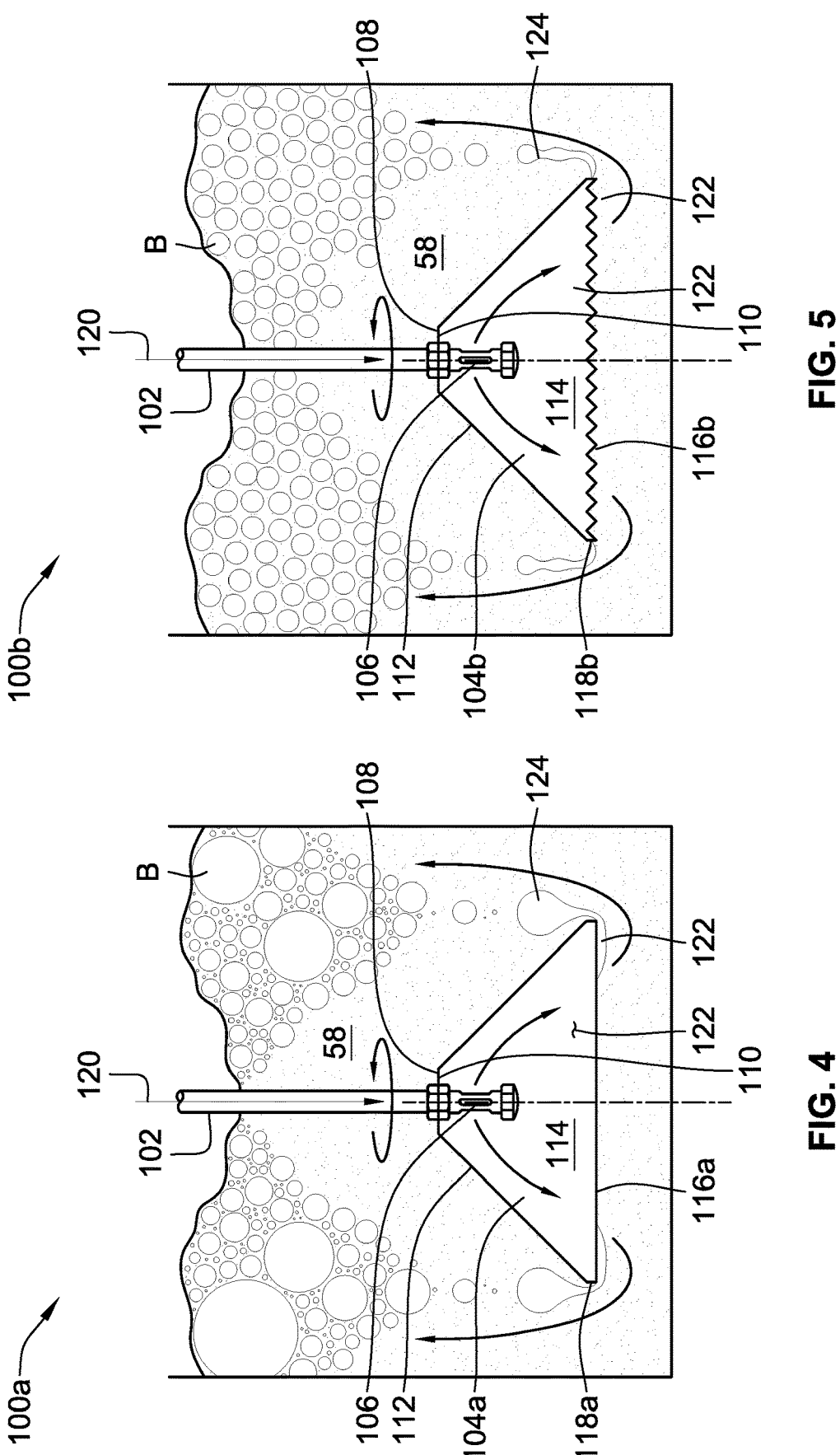
FIG. 4 is a side view of a first embodiment of a sparger for use in the systems of FIGS. 2-3.
FIG. 5 is a side view of a second embodiment of a sparger for use in the systems of FIGS. 2-3.

Turning to FIG. 4, a first embodiment of the sparger 100*a* includes a gas inlet tube 102 and an enclosure hood 104*a*. The inlet tube 102 projects from the outside of tank 42 into the interior 58 containing the mixture, and adjacent the distal end thereof includes one or more tube outlets 106. In the depicted embodiment, the tube outlet comprises four radially spaced slots that are elongated in the vertical direction, although they may take other forms. The enclosure hood 104*a* is affixed to the inlet tube 102 vertically above the outlets 106, e.g. via nuts 108 engaging threads formed on the exterior of the inlet tube 102 and located above and below an upper wall 110 of the hood 104*a*. Seals or gaskets may also be employed to fluidically close off the upper end of the enclosure hood 104*a*. The hood 104*a* includes one or more side walls 112 projecting downwardly from the upper wall 110 while sloping radially outwardly to radially enclose the gas tube outlets 106 and define an interior space 114. That is, a diameter of the enclosure hood 104*a* at the open lower end 116 is greater than a diameter at the upper end at upper wall 110. Preferably the enclosure hood takes a conical or frusto-conical shape, although the hood may be fully or partly pyramidal, or may have a cross-sectional area (taken about a horizontal plane) that is oblong, elliptical, triangular, rectangular or other cross-sectional shape that expands outwardly as the hood extends vertically downward.

The open lower end 116 of the enclosure hood 104*a* is defined by a peripheral rim 118*a*, which can simply be the terminal edge of the side wall(s) 112, or may be angled relative thereto, e.g. to be generally parallel with the vertical axis VA as shown in FIGS. 4 and 5. The peripheral rim 118*a* is a flat edge in the embodiment of FIG. 4. In the embodiment of FIG. 5, the peripheral rim 118*b* is serrated to define a number of teeth extending radially around the rim 118*b*.

Notably, a gas supply 120 provided to the inlet tube 102 has a pressure sufficient to form a gas pocket 122 that fills most, if not all, of the interior space 114 within the enclosure hood 104*a*. The gas pocket 122 extends from at least the gas outlet 106 to the peripheral rim 118*a*, 118*b*. In this way, the mixture and paint solids are largely prevented from entering the interior space 114 and sticking to the interior of the hood 104*a*, and hence will not clog the outlets 106 of the gas delivery tube 102. The flow of gas 120 allows portions of the gas pocket 122 to escape over the peripheral rim 118*a*, 118*b* where it naturally grows to form discrete bubbles 124 until they detach to form bubbles B which rise through the mixture, attaching to hydrophobic particles and bringing them to the upper surface of the tank 52. By providing the gas bubbles B, the paint sludge separation system 50 enhances separation of hydrophobic solids without increasing the use of flocculants or other surface tension modifiers (surfactants). Additionally, the use of gas bubbles facilitates classification between hydrophobic and hydrophilic solids.

Accordingly, the sparger 100 is preferably positioned vertically above the mixer 70. Adjustments in the gas flow rate allows the size of the bubbles B to be controlled, as the effective size and/or amount of bubbles B can be increased as the gas flow rate increases. Control over the surface tension of the liquid in the tank 52, e.g. through use of surfactants, also affects the size of the bubbles B. The serrations of the peripheral rim 118*b* (FIG. 5) also affects the size of the bubbles B. Serrations in the peripheral rim 118*b* can be designed to create gas ligaments that grow, destabilize and pinch off into a series of narrowly-sized typically spherical bubbles. Assuming the flat-edged peripheral rim 118*a* of FIG. 4 is perfectly level (which may be difficult to achieve and maintain in a plant environment), the formation and the size of the bubbles B depend on the balance of mechanical and chemical phenomena and tend to be less easy to control. Under certain conditions, the size of bubbles B detached from flat-edged peripheral rim 118*a* of FIG. 4, may appear random. Therefore, serrations in the peripheral rim 118*b* of FIG. 5 provide enhanced control over the formation and size of the bubbles B. Also, the presence of serrations reduces to certain extent the need for the edge 118*b* to be perfectly level.

In both embodiments of the sparger 100*a*, 100*b* of FIGS. 4 and 5, as well as in the other embodiments, the sparger may be configured to rotate about the vertical axis VA. In the depicted embodiments, the gas inlet tube 102 and enclosure hood 104*a*, 104*b* are engaged for rotation together, although the hoods 104 could be rotatably mounted to the gas inlet tube with a sliding seal and local prime mover to cause rotation of the hoods 104. In either case, rotation of the hoods 104 provided further control over the size of the bubbles B formed, and the serrations of the rim 118*b* in FIG. 5 allow the growing gas ligaments to be 'chopped' or otherwise disturbed to reduce the size of the bubbles B.

Figures 9, 10:
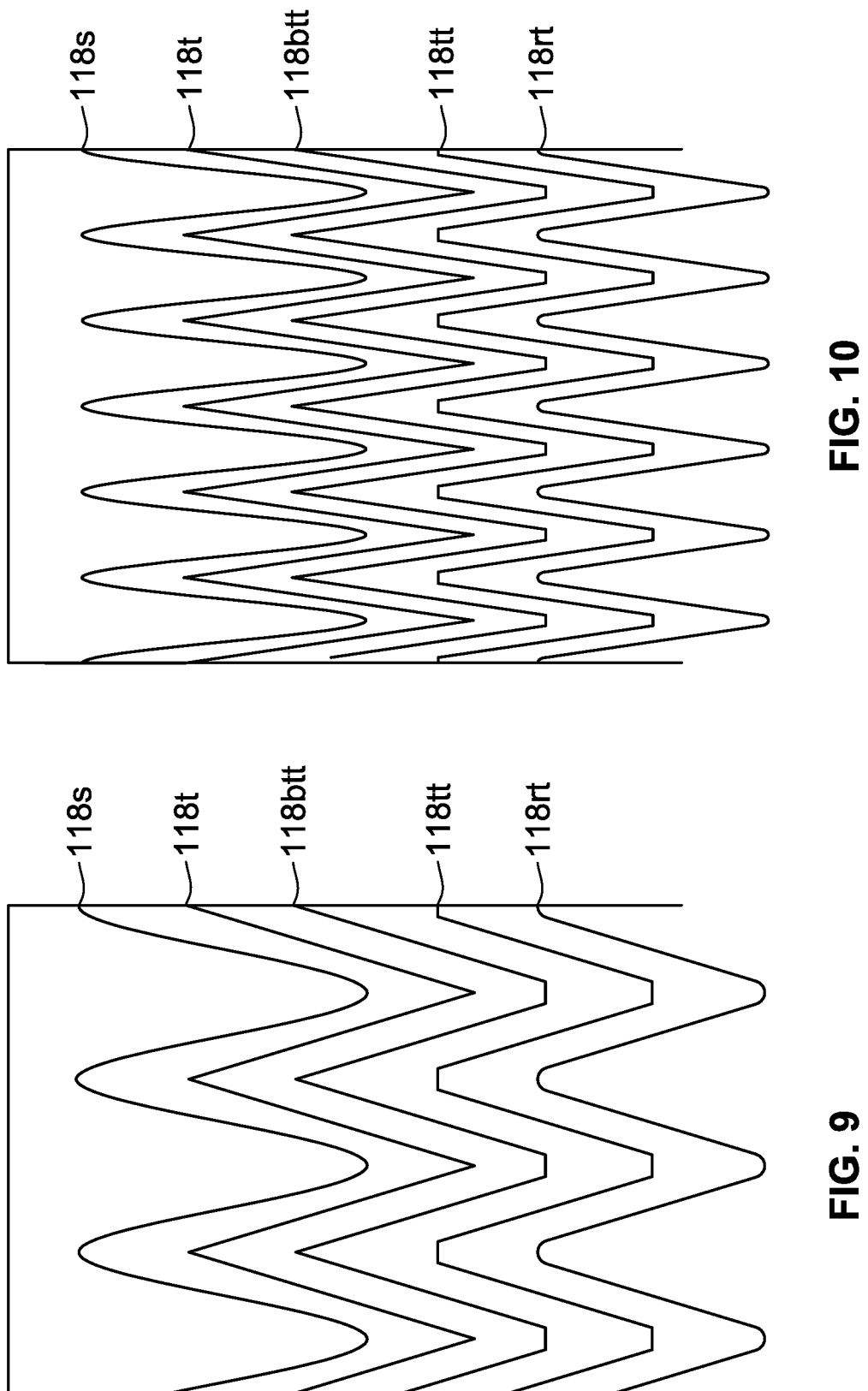
FIGS. 9 and 10 are side views showing variations of the second, third, fourth and fifth embodiments of the sparger of FIGS. 5-8.

As shown in FIGS. 9 and 10, the serrations of the peripheral rim 118*b* may be configured to affect bubble formation. The serrations or series of teeth may be shaped to be sinusoidal 118*s*, triangular 118*t*, bottom truncated triangular 118*btt*, truncated triangular 118*tt*, rounded triangular 118*rt*, or other shapes that will be apparent to the skilled artisan. The pitch or frequency of the teeth may also be configured based on the particular chemicals of the system, and FIG. 9 shows a greater pitch/lower frequency than that of FIG. 10. The lower frequency generally induces larger, less populated bubbles, while a higher frequency induces smaller, more populated bubbles.

Turning back to FIG. 6, another embodiment of the sparger 100*c* is depicted. In this embodiment, the distal end portion of the gas inlet tube 102*c* is provided with three outlets 106*c*$_1$, 106*c*$_2$ and 106*c*$_3$ which are axially/vertically spaced apart. Three enclosure hoods 104*c*$_1$, 104*c*$_2$ and 104*c*$_3$ are provided corresponding respectively to the spaced outlets 106*c*$_1$, 106*c*$_2$ and 106*c*$_3$. Preferably, the overall size of the hoods 104*c*$_1$, 104*c*$_2$ and 104*c*$_3$ increases as one moves vertically downward and further along the gas inlet tube 102*c* into the tank 52 and mixture 58. That is, a width or diameter of the peripheral rim 118*c*$_1$ is less than a width or diameter of the peripheral rim 118*c*$_2$, so that bubbles B escaping around the peripheral rim 118*c*$_2$ are not trapped by the hood 104*c*$_1$ and can float freely up to the top of the tank 52. As with the previous embodiments, the inlet tube 102*c* and hoods 104*c*$_1$, 104*c*$_2$ and 104*c*$_3$ can be rotated to control the size of the bubbles B. While three hoods have been shown, any number of hoods may be employed. Since outlet 106*c*3 is deeper in the fluid than, for example, outlet 106*c*1, the pressure to overcome by the air is greater. To avoid most of the injected air 120 to exit through outlet 106*c*1, the size of the outlets may be changed to increase local pressure loss and balance the flow of air to each enclosure hood. For example, assuming same serration frequency and design in the three enclosure hoods shown, the air can be easily balanced to generate a desired bubble size distribution. Preferably, the flow of air to each enclosure hood may be adjusted according to the length, or the number of serrations, of the peripheral rim 118*c*1, 118*c*2, 118*c*3. Preferably, outlet 106*c*1 may be smaller than outlet 106*c*2, which in turn may be smaller than outlet 106*c*3. A well-balanced sparger trio as described should generate bubbles of similar size, while a non-balanced sparger trio would generate bubbles of different sizes. The choice of uniform bubble size vs different bubble sizes depends on the application and should be recognized by the skilled artisan.

Figure 6:
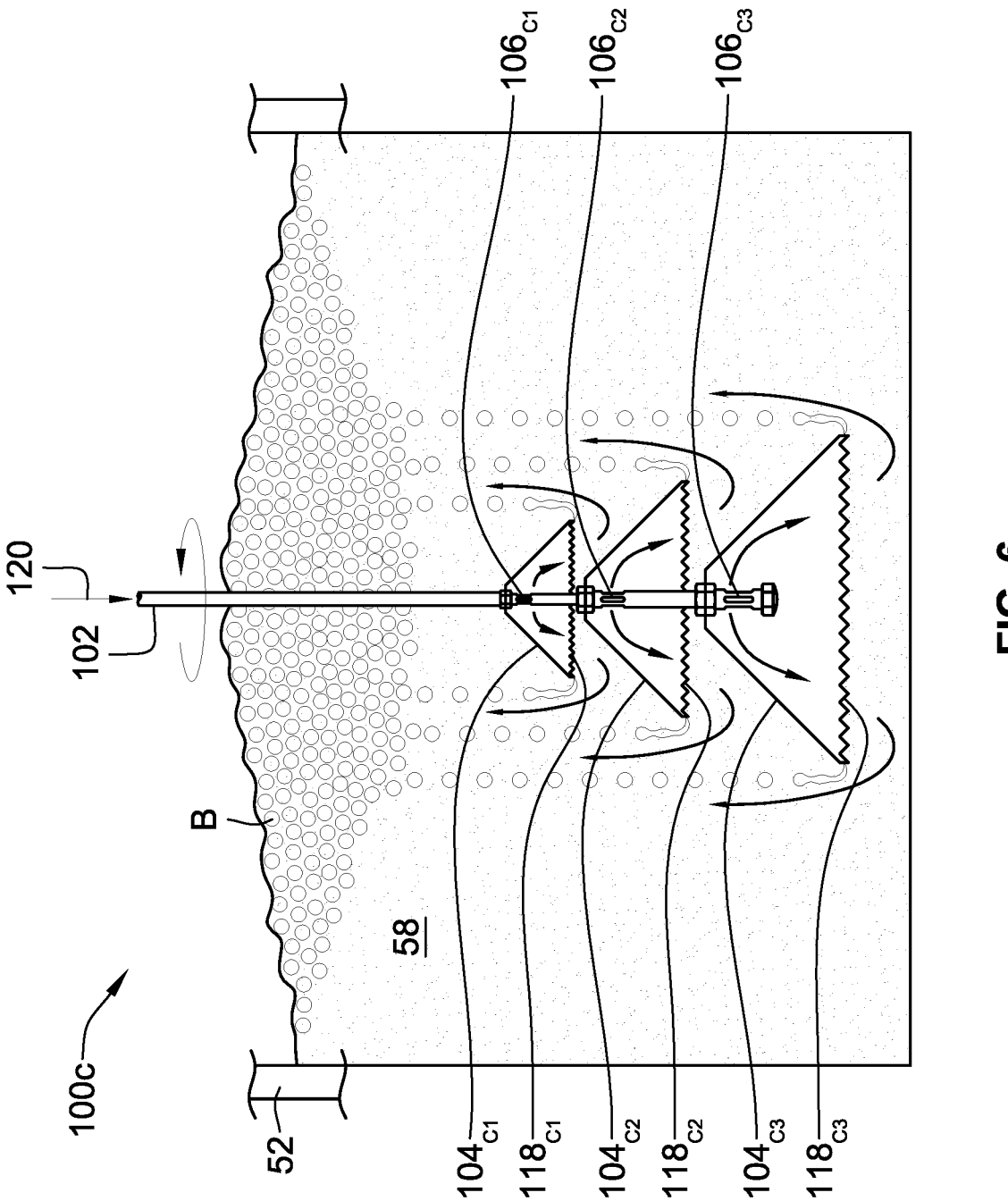
FIG. 6 is a side view of a third embodiment of a sparger for use in the systems of FIGS. 2-3.
Figure 6A:
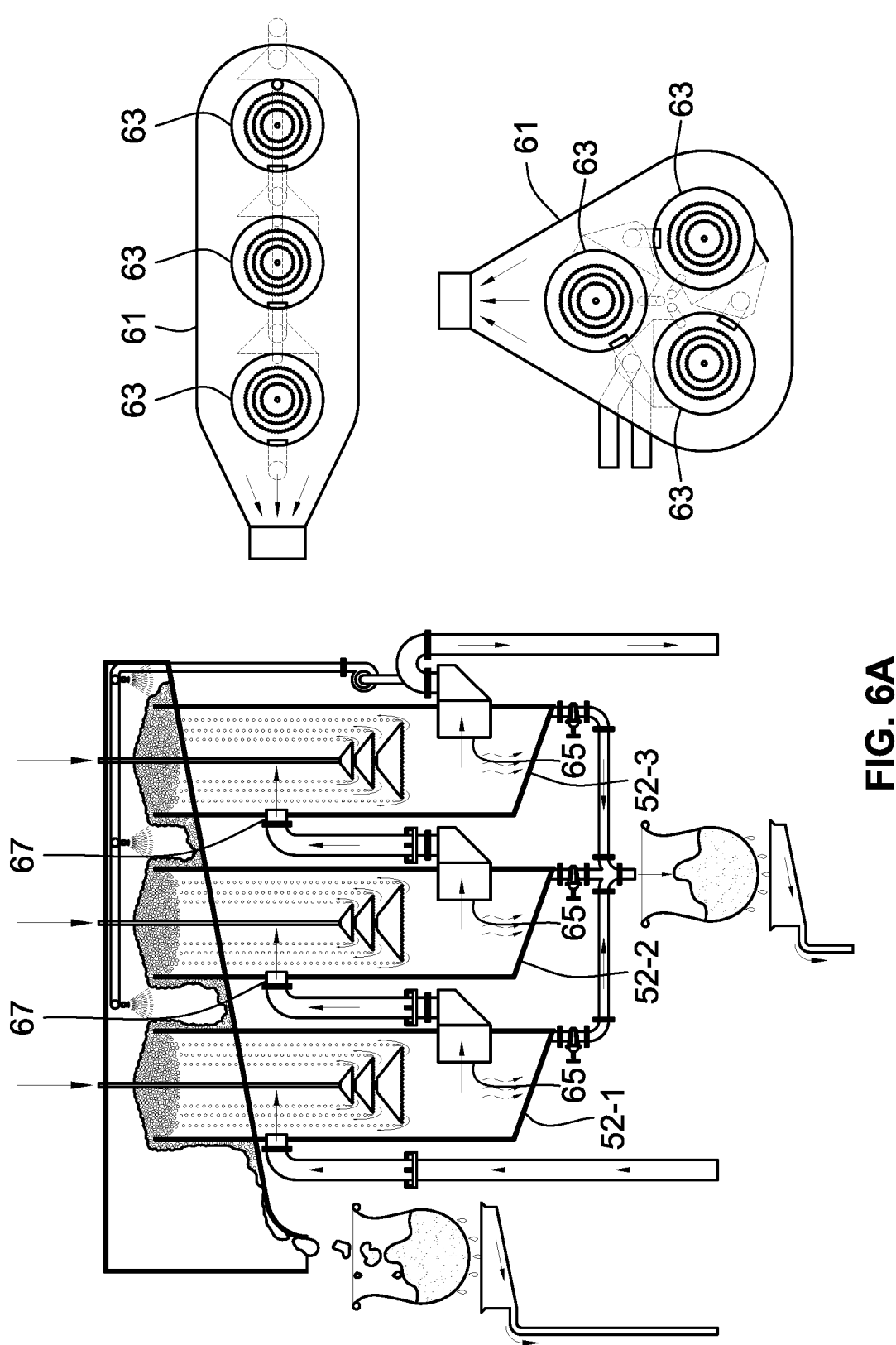
FIG. 6A is a side view of a separation system having a series of tanks and spargers of FIG. 6.

In the embodiment of FIG. 6A [NOTE: No labels are present in the provided FIG. 6A], the separator system 50 includes a series of tanks 52-1, 52-2, 52-3, three being shown in the figure. The three tanks may be linearly aligned or may be arranged in a triangular or any other suitable configuration to reduce floor space requirements. A common collecting pan 61 includes an opening 63 for each tank 52-1, 52-2, 52-3 which passes therethrough. The collecting pan 61 is sloped relative to the horizontal, as well as relative to the vertical axis of each tank. In this way, the outflow of paint sludge from each tank can be commonly collected in a single decanter. The tanks are arranged to subsequently (or serially) provide several levels (in this case three levels) of sludge separation. Each one of the tanks 52-1, 52-3, 52-3 is shown to have a bottom outlet controlled by a valve at the end of a sloped bottom to periodically exhaust solids that did not float. Since these outlets do not need to operate simultaneously, after the valves, the bottom outlets are shown to join into to common pipe that directs the sinked solid mixture to a decanter. After the first separation step in first tank 52-1, the cleaned mixture below the spargers is pushed by gravity, or alternatively pumped, via the outlet 65 to an inlet 67 of the second tank 52-2, where the mixture will be submitted to an additional process of froth floatation to further separate (float) the remaining solids still present in the water. The second tank 52-2 can be tuned to a different operational condition than that of tank 52-1. Preferably, tank 52-2 may use different bubble size (spargers operating at different set points) as well as different chemical balance, to maximize separation of the remaining solid in the water. After a second separation, the mixture in the second tank can be either pushed by gravity or pumped via its outlet 65 to an inlet 67 of the third tank 52-3, where the remaining solids in the mixture can be further separated in a fashion similar to that of tank 52-2. Operating conditions in tank 52-3 are tuned to separate the solids still present in the mixture and do not need to resemble either mechanically or chemically conditions in tanks 52-1 or 52-2. While three tanks have been shown, the series of tanks can comprise 2 or 4 or more tanks. It is anticipated that the first tank 52-1 will separate the bulk of the solids, while the second and third tanks 52-2, 52-3 will separate the remaining solids so that the effluent water becomes cleaner at each stage. The final effluent water can be recirculated back to the painting system (e.g. the wet scrubbers therein). An additional outlet is provided after the final tank (52-3) to divert and pump part of the cleaned effluent water to help flush the froth from the collecting pan 61 to a decanter. It should be emphasized that the spargers for each tank 52-1, 52-2, 52-3 can each take different form from the others, e.g. the spargers of the second and third tanks can be formed to create bubbles smaller than those of the first tank, or contain different chemical compositions of flocculants or surfactants.

Figures 7, 8:
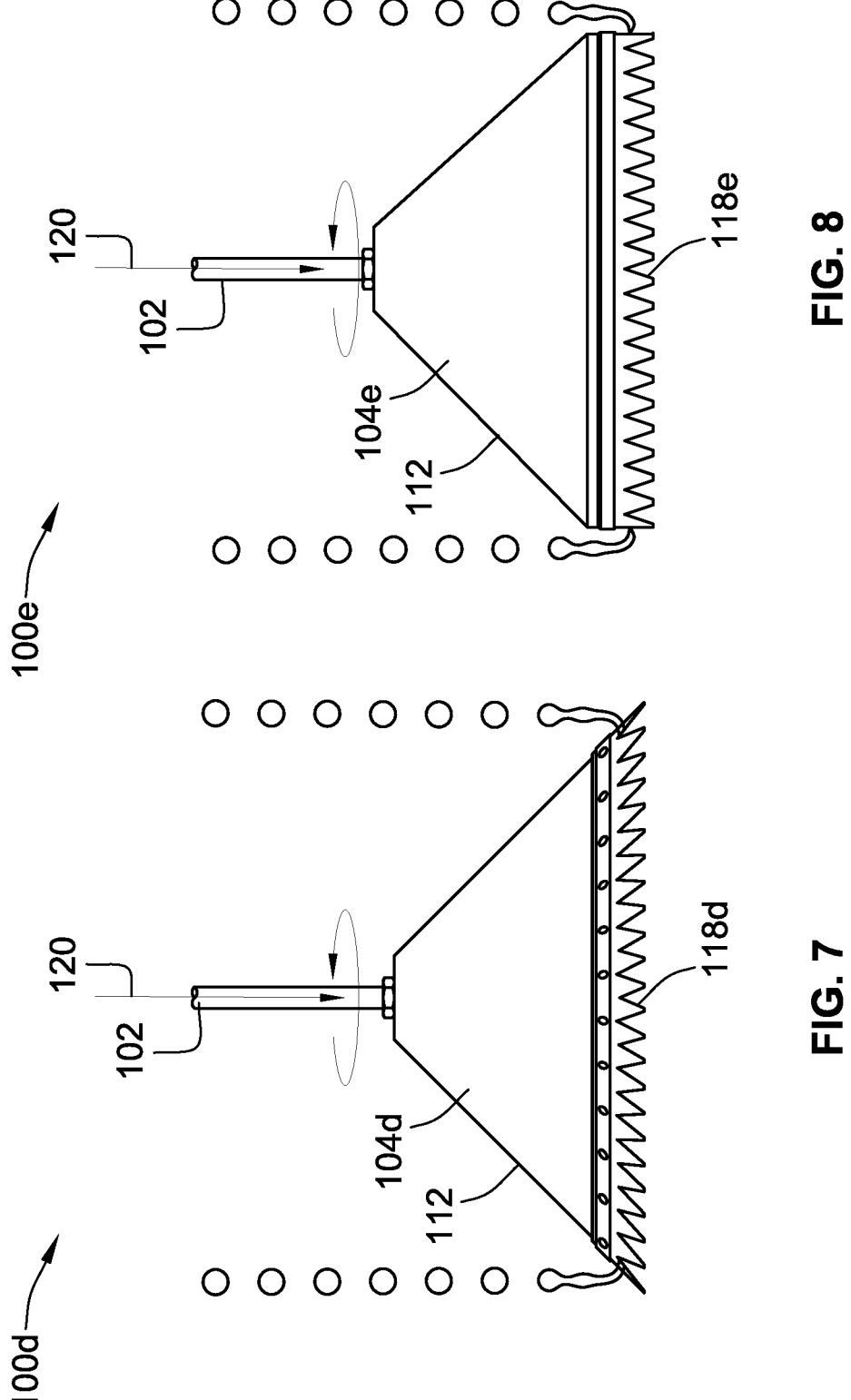
FIG. 7 is a side view of a fourth embodiment of a sparger for use in the systems of FIGS. 2-3.
FIG. 8 is a side view of a fifth embodiment of a sparger for use in the systems of FIGS. 2-3.

FIGS. 7 and 8 show several variations of the peripheral rims 118. In both embodiments, the peripheral rims 118*d* and 118*e* are separately formed and attached to the side wall(s) 112 of the hoods 104*d* and 104*e*, respectively. They may be more permanently attached using rivets or adhesives, or may be replaceable such that the hoods 104 are configurable and adaptable to different mixtures, chemicals, etc. In FIG. 7, the peripheral rim 118*d* is flared and takes an angle generally parallel to the side wall(s) 112, whereas in FIG. 8 the peripheral rim 118*e* is angled to extend vertically and generally parallel to the vertical axis VA. As with the prior embodiments, the peripheral rims 118*d*, 118*e* are shown as being serrated, but may take other forms.

Figure 11:
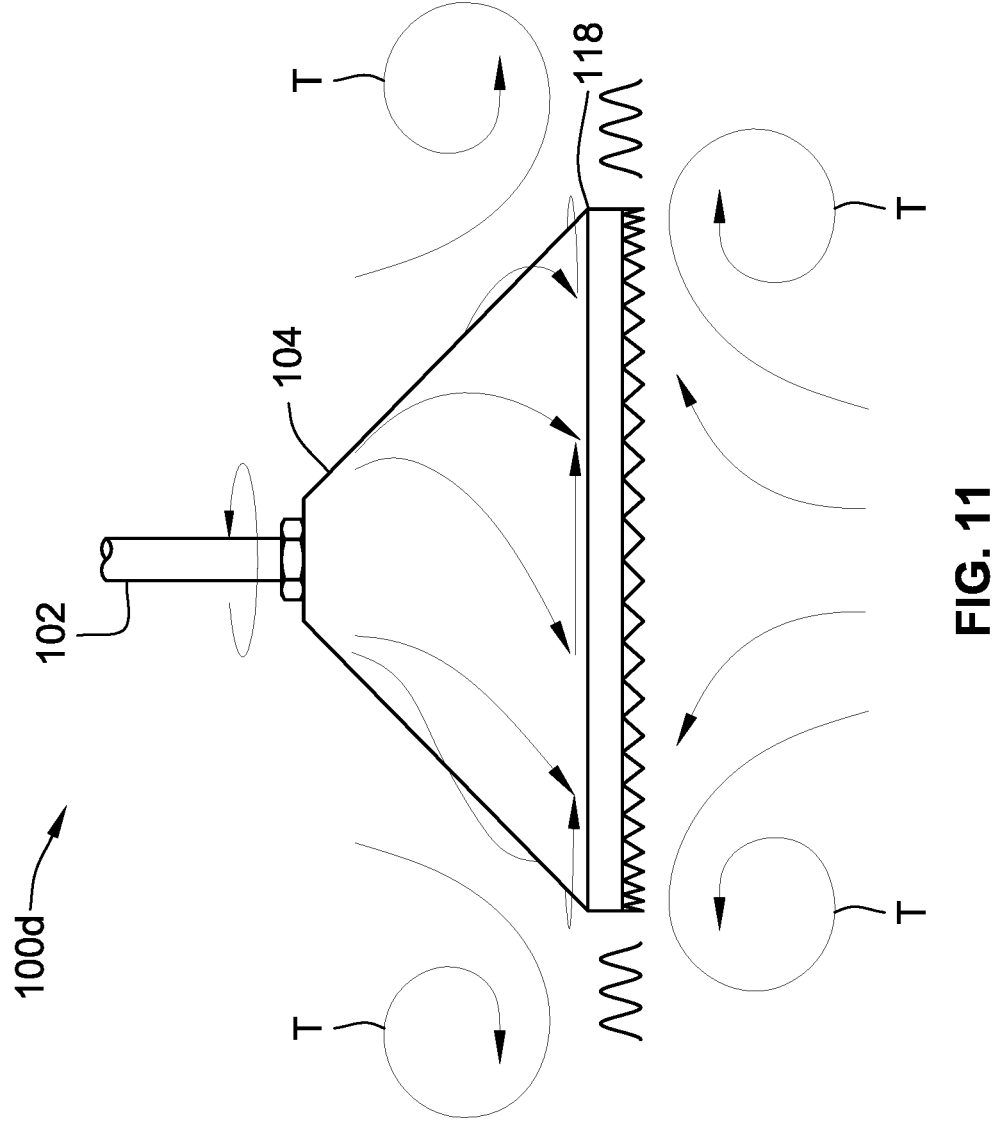
FIG. 11 is a side view of a sixth embodiment of a sparger for use in the systems of FIGS. 2-3.
Figure 12:
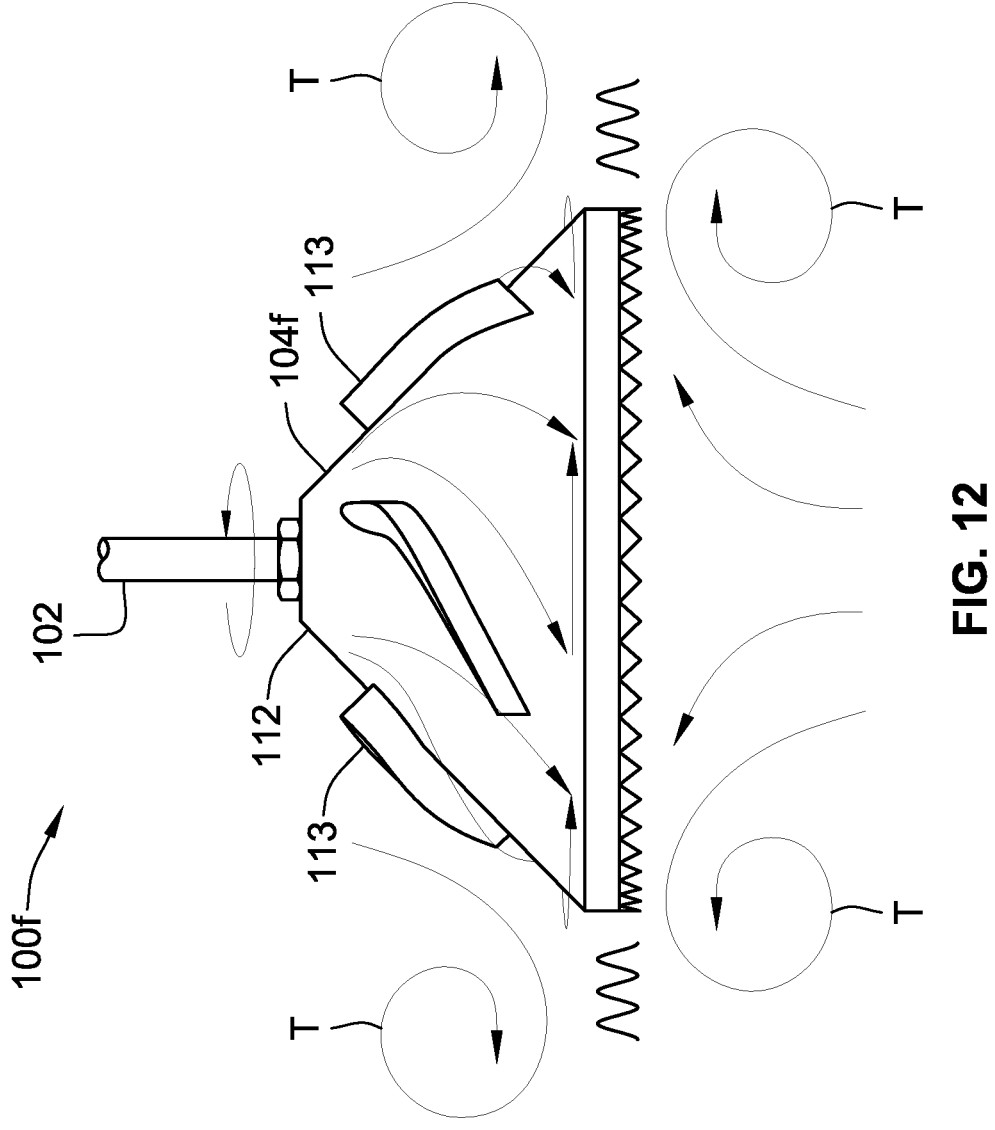
FIG. 12 is a side view of a seventh embodiment of a sparger for use in the systems of FIGS. 2-3.
Figure 13:
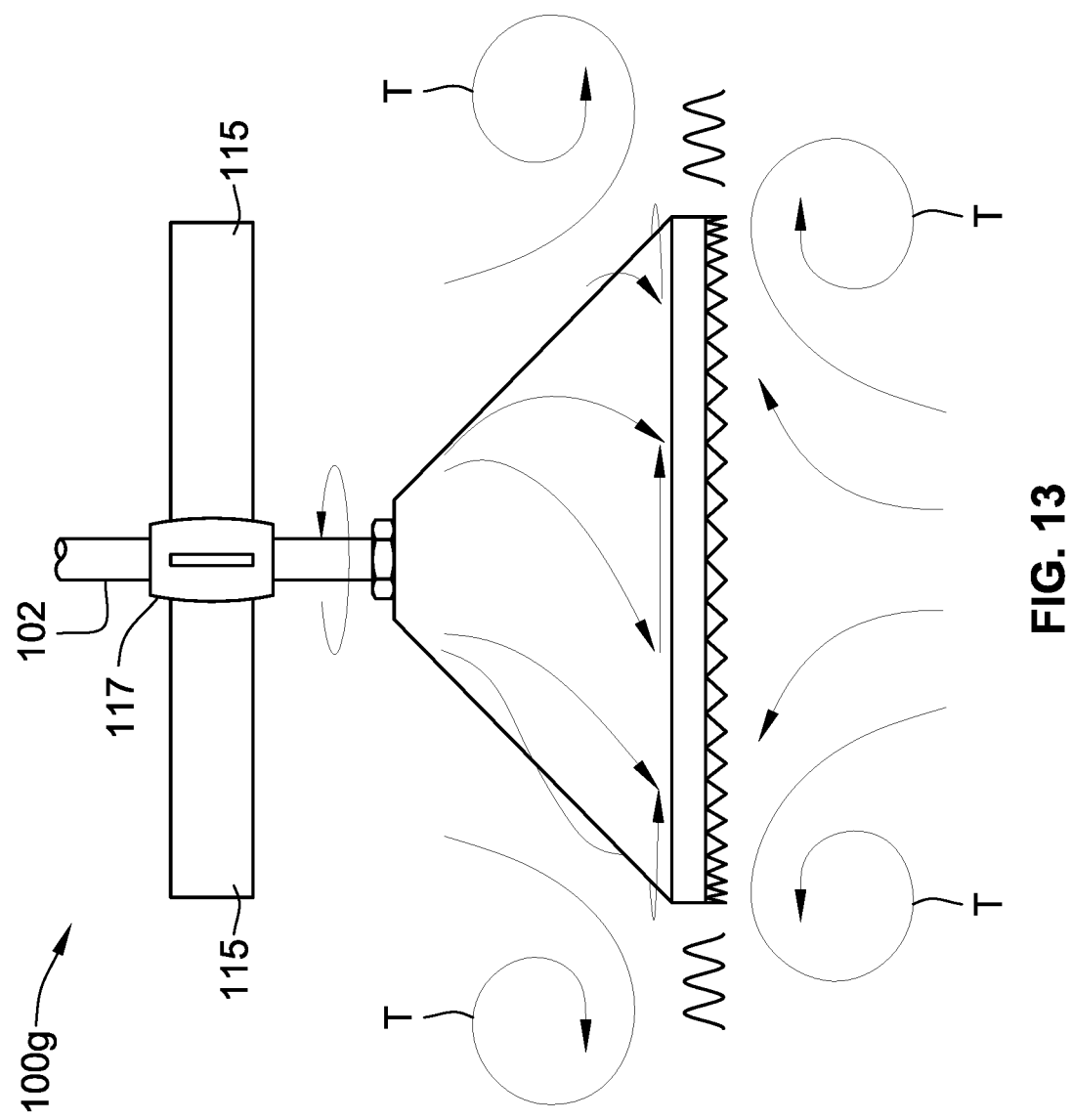
FIG. 13 is a side view of an eighth embodiment of a sparger for use in the systems of FIGS. 2-3.

FIG. 11 shows the flow of the mixture in the tank 58 caused by rotation of a hood 104. In general, turbulent zones T are created above, below and radially outside of the peripheral rims 118. FIG. 12 depicts another embodiment of the sparger 100*f* where the enclosure hood 104*f* includes one or more fins 113 projecting from the exterior surface of the side wall(s) 112. The fins 113 are preferably curved in the circumferential direction as they extend from an upper portion to a lower portion of the hood 104*f*. The fins 113 further enhance the distribution of the bubble B and created of turbulent zones T. Similar to the embodiment of the sparger 100*g* shown in FIG. 13, when the inlet tube 102 is rotatable, one or more blades 115 may be attached to the tube 102 and project radially outwardly therefrom to enhance bubble formation and distribution. In one example, a hub 117 is affixed to the gas inlet tube 102 and supports four stirrer blades 115 which are spaced circumferentially and equidistantly around the tube 102. The blades of the stirrer may be flat (as shown) or curved as in a propeller to increase flow in the vertical direction.

Figures 14, 15:
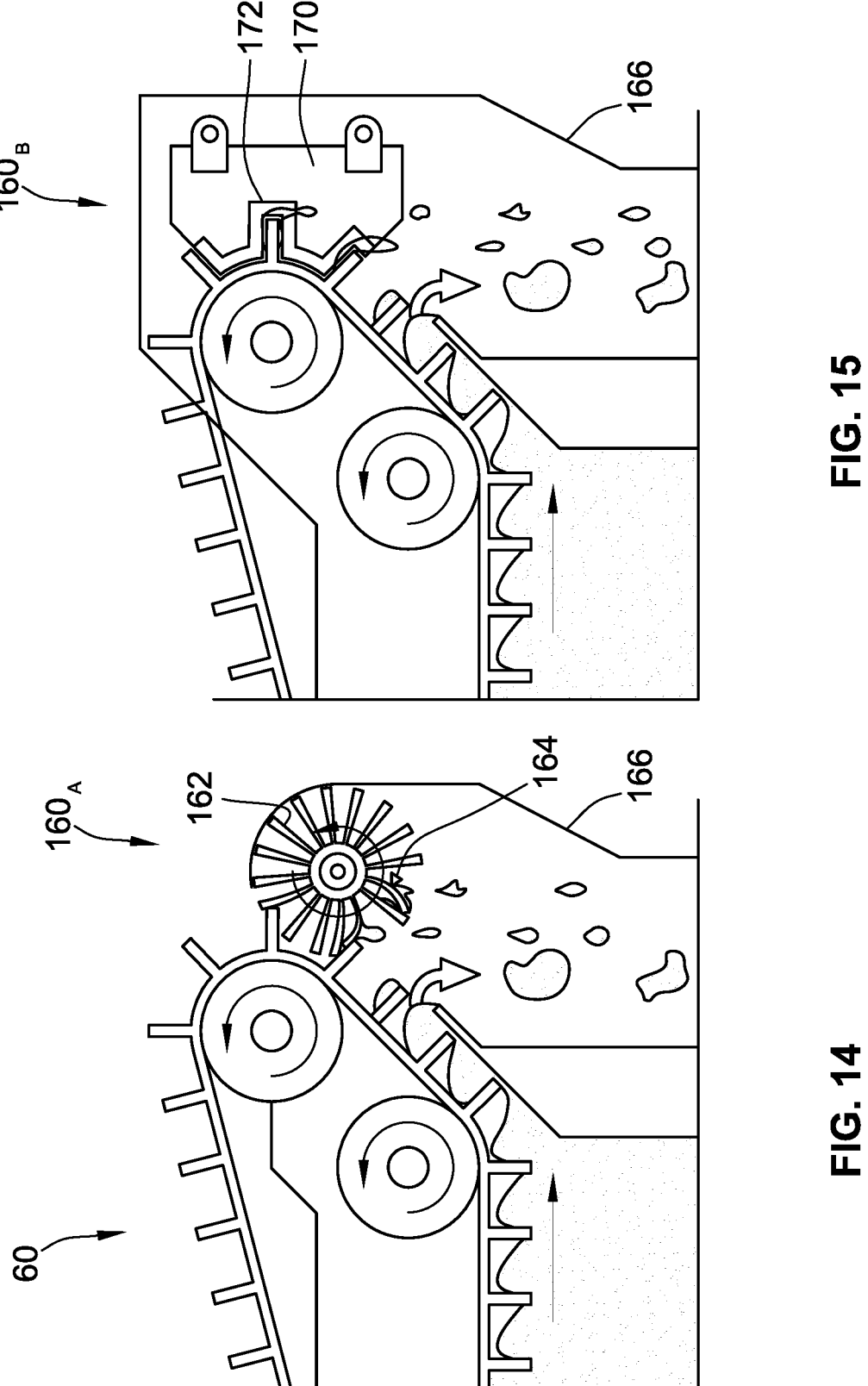
FIG. 14 is a side view of a first embodiment of a paddle cleaner for use in the system of FIGS. 1-2.
FIG. 15 is a side view of a second embodiment of a paddle cleaner for use in the system of FIGS. 1-2.
Figure 16:
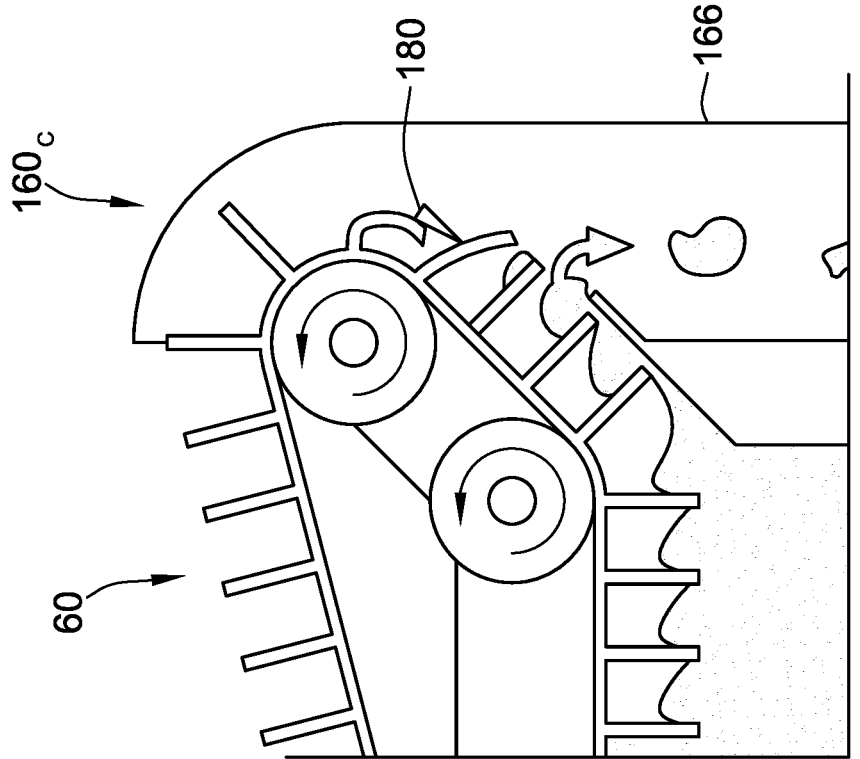
FIG. 16 is a side view of a third embodiment of a paddle cleaner for use in the system of FIGS. 1-2.
Figures 17A, 17B, 17C, 18A, 18B, 18C:
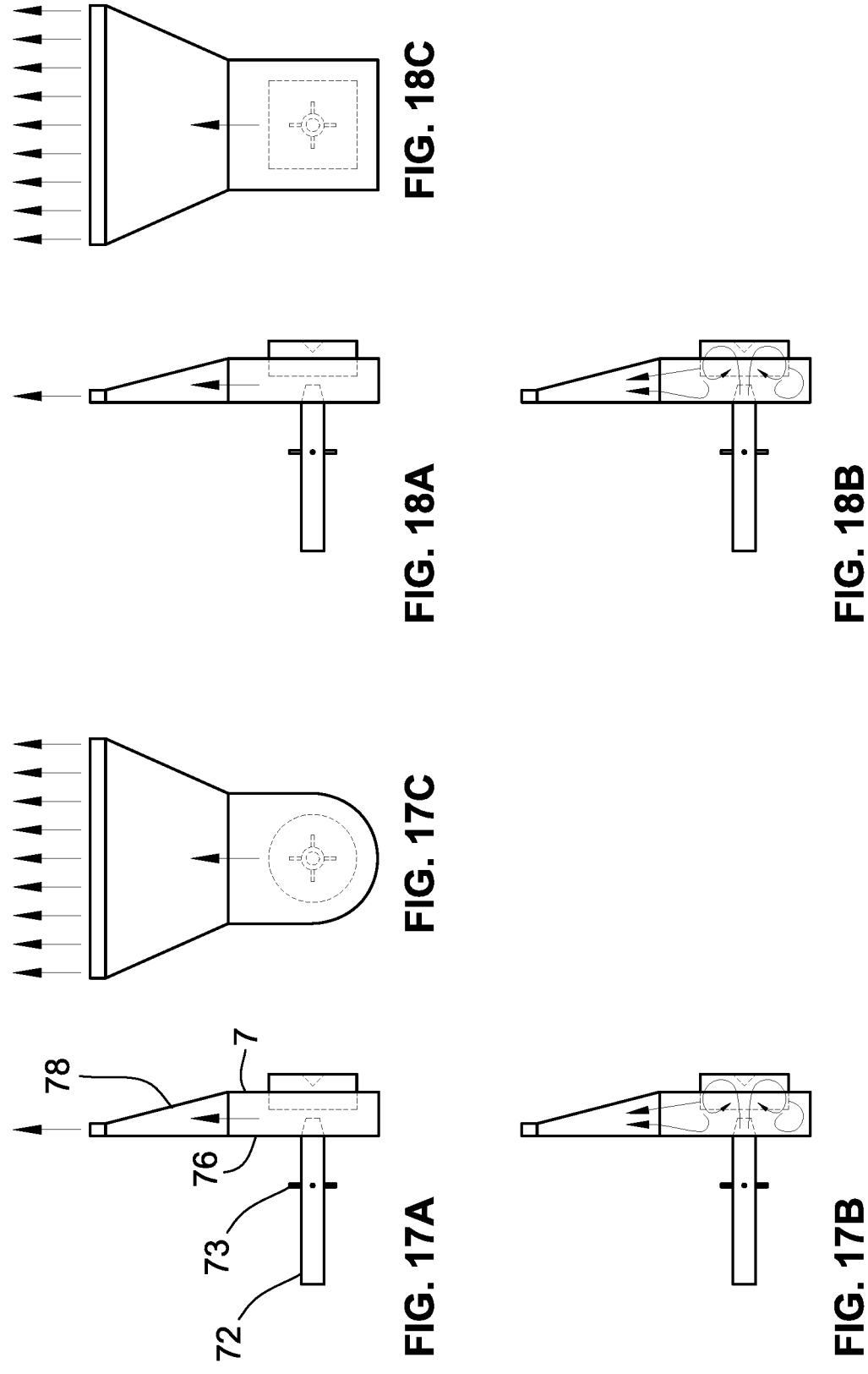
FIGS. 17A-17C are a side view, a cross-sectional side view, and a front view, respectively, of a first embodiment of a mixer for use in the system of FIGS. 1-3.
FIGS. 18A-18C are a side view, a cross-sectional side view, and a front view, respectively, of a second embodiment of a mixer for use in the system of FIGS. 1-3.
Figures 19A, 19B, 19C, 20A, 20B, 20C:
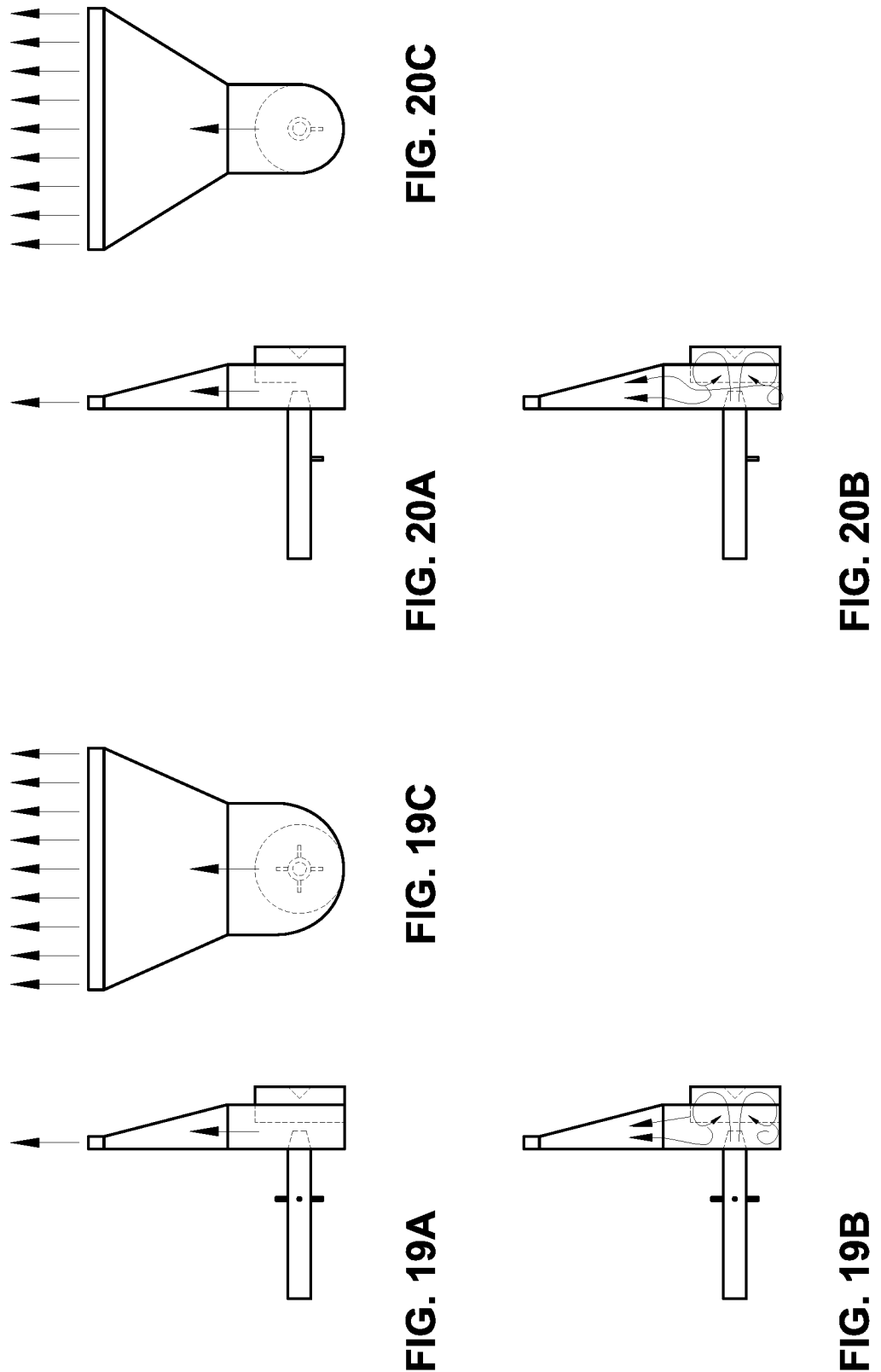
FIGS. 19A-19C are a side view, a cross-sectional side view, and a front view, respectively, of a third embodiment of a mixer for use in the system of FIGS. 1-3.
FIGS. 20A-20C are a side view, a cross-sectional side view, and a front view, respectively, of a fourth embodiment of a mixer for use in the system of FIGS. 1-3.
Figures 23A, 23B, 23C, 24A, 24B, 24C:
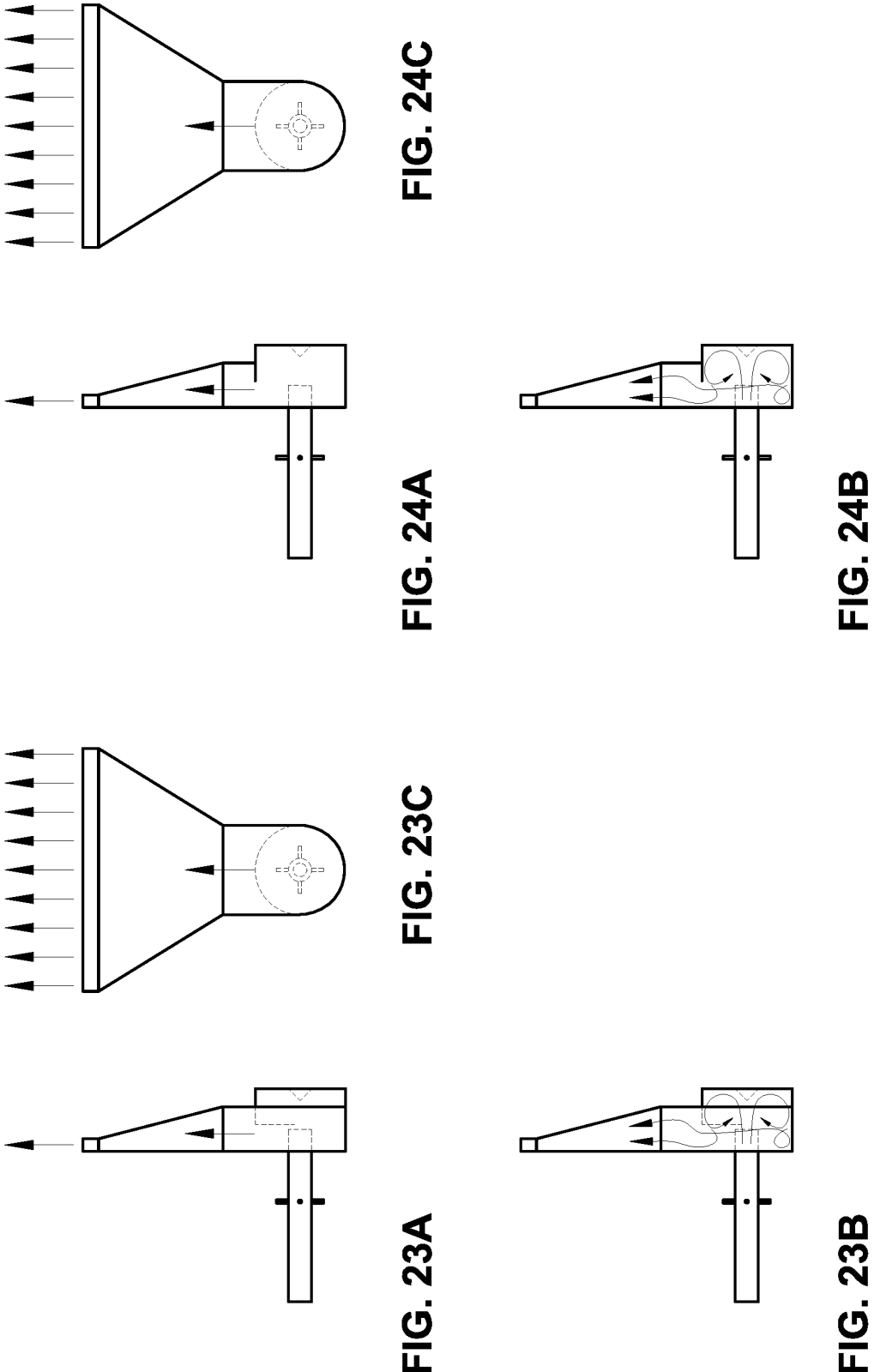
FIGS. 23A-23C are a side view, a cross-sectional side view, and a front view, respectively, of a seventh embodiment of a mixer for use in the system of FIGS. 1-3.
FIGS. 24A-24C are a side view, a cross-sectional side view, and a front view, respectively, of an eighth embodiment of a mixer for use in the system of FIGS. 1-3.

Turning now to FIGS. 14-16, various embodiments of paddle cleaners 160*a*, 160*b* and 160*c* are shown. In FIG. 15, the cleaner 160*a* includes a rotating brush 162 with flexible bristles arranged in a circular shape that rotates in the same direction as the belt and paddles of the conveyor 60. The brush 162 increases the amount of paint sludge removed and delivered to the decanter 62. A bristle scraper may also be fixed in a position relative to the brush 162, e.g. by attaching it to a cleaner housing 166. In the embodiment of FIG. 15, a traversing blade 170 is provided for removing paint sludge from the paddles of the conveyor 60. The blade 170 is configured for lateral translation (e.g. in and out of the page in FIG. 15), and includes a scraping edge 172 that engages one or more paddles of the conveyor 60. The scraping edge 172 may be formed of a different material than the blade 170, e.g. of silicone or other plastics or elastomers. Running the conveyor 60 with a stepped rotation allows time for the sliding blade 170 to scrape laterally across the paddles. Alternatively, the traversing blade, or group of traversing blades, could move in a path corresponding to a partial path of the conveyor paddles so that the conveyor can also be run continuously. Different to paddles in FIGS. 14 and 15, paddles in FIG. 16 are made of a flexible material that restores it shape after being deformed. This flexible material is stable to the typical chemicals present in the paint sludge. In the embodiment of FIG. 16, the cleaner 160c simply comprises a scraper 180 that is fixed relative to the flexible paddles of the conveyor 60 and located to engage and scrape paint sludge from the flexible paddles as shown.

FIGS. 17A-17C, 18A-18C, 19A-19C, 20A-20C, 21A-21C, 22A-22C, 23A-23C and 24A-24C depict various configurations of the mixer 70. In general, each mixer 70 receives paint sludge from the settling tank via a sludge inlet tube 72. This inlet tube 72 includes one or more ports 73 upstream of the mixer 70 for the injection of chemicals or gases such as flocculants, surfactants and/or air. The inlet tube 72 extends into a lower portion of the mixer which defines a mixing chamber 76. The mixing chamber may include a mixing pocket 77 that further enhances the mixing of the paint, water, and chemicals. Forced flow of the paint sludge causes the mixture to move from the lower mixing chamber to an upper portion of the mixer what defines a nozzle 78. In general, the nozzle 78 increases in width and decreases in depth to accelerate the flow of the mixture into the tank (e.g. the overall cross-sectional area decreases as the mixture moves upwardly through the nozzle 78). In this way, the boundary layers at the surfaces of the nozzle 78 are not allowed to grow, resulting on a uniformly distributed speed across the entire flow area. Further, the outlet area of the nozzle can be designed to cover the complete width of the tank, whereby no areas of detrimental recirculation or downward flow occur.

In some embodiments, a lower surface of the mixing pocket 77 is vertically above a lower surface of the mixing chamber 76 (e.g. FIGS. 17 and 18), whereas in other embodiments the mixing pocket 77 extends down to the bottom of the mixing chamber 76. In general, the mixing pocket 77 provides an area of greater depth to the mixing chamber 76 and includes various baffles and/or walls to promote mixing, however in the embodiment of FIG. 21 the depth is the same and only the baffles and walls are formed within the main mixing chamber 76. In some embodiments a bottom wall of the mixing chamber 76 and a bottom wall of the mixing pocket 777 are squared off (e.g. FIGS. 18 and 22-24), and in others the bottoms walls are curved to form a semi-circular surface (e.g. FIGS. 17 and 19-21). In all embodiments, the mixer 70 provides vortex generation with a highly turbulent core to enhance mixing of chemicals with the sludge. Due to the vortex generation, the mixers 70 are typically hard to clog because any debris that accumulates inside the mixer increases velocity, so the flow shears the debris away.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A system for paint sludge separation in a tank defining a vertical axis and containing a mixture of paint and liquid, the tank having an open upper end for moving paint sludge out of the tank, the system comprising:

a sparger comprising a gas inlet tube fluidically connected to an enclosure hood, the inlet tube projecting downwardly into the tank to a tube outlet, the enclosure hood having a closed upper end that radially encloses the tube outlet, the enclosure hood extending downwardly to an open lower end to define an interior volume between the upper and lower ends, the lower end defining a peripheral rim with a diameter greater than a diameter of the enclosure hood at the closed upper end; and a gas supply feeding the gas inlet tube of the sparger, the gas supply having a pressure that forms a gas pocket within the interior volume of the enclosure hood that extends from the tube outlet to the peripheral rim such that portions of the gas pocket pass over the peripheral rim and form gas bubbles which rise through the mixture towards the open upper end of the tank, the open lower end being unobstructed such that the portions of the gas may freely pass over the peripheral rim.

2. The system of claim 1, wherein the enclosure hood has a conical or frusto-conical shape.

3. The system of claim 1, wherein the peripheral rim defines a flat peripheral edge.

4. The system of claim 1, wherein the peripheral rim is serrated to define a plurality of teeth.

5. The system of claim 4, wherein the teeth are shaped as at least one of sinusoidal, triangular, truncated triangular and rounded triangular.

6. The system of claim 1, wherein the peripheral rim is separately formed and attached to the enclosure hood.

7. The system of claim 1, wherein the peripheral rim is flared outwardly relative to an axis of the inlet tube.

8. The system of claim 1, wherein the peripheral rim extends generally parallel to the vertical axis.

9. A system for paint sludge separation in a tank defining a vertical axis and containing a mixture of paint and liquid, the tank having an open upper end for moving paint sludge out of the tank, the system comprising:

a sparger comprising a gas inlet tube fluidically connected to an enclosure hood, the inlet tube projecting downwardly into the tank to a tube outlet, the enclosure hood having a closed upper end that radially encloses the tube outlet, the enclosure hood extending downwardly to an open lower end to define an interior volume between the upper and lower ends, the lower end defining a peripheral rim with a diameter greater than a diameter of the enclosure hood at the closed upper end; and a gas supply feeding the gas inlet tube of the sparger, the gas supply having a pressure that forms a gas pocket within the interior volume of the enclosure hood that extends from the tube outlet to the peripheral rim such that portions of the gas pocket pass over the peripheral rim and form gas bubbles which rise through the mixture towards the open upper end of the tank, wherein the enclosure hood is rotatably mounted relative to the tank such that the hood can be rotated within the tank.

10. The system of claim 1, wherein the inlet tube and enclosure hood are rotatably mounted relative to the tank such that the inlet tube and hood can be rotated within the tank.

11. The system of claim 9, wherein an outer surface of the enclosure hood include at least one stirring fin attached thereto and projecting into the tank.

12. The system of claim 10, wherein an outer surface of the inlet tube includes at least one stirring blade attached thereto and projecting into the tank.

13. The system of claim 1,
wherein tube outlet of the inlet tube is a first tube outlet, and wherein the inlet tube includes a second tube outlet vertically above the first tube outlet,
wherein the enclosure hood is a first enclosure hood, and wherein the sparger includes a second enclosure hood having a closed upper end that radially encloses the second tube outlet, the second enclosure hood extending downwardly to an open lower end to define an interior volume between the upper and lower ends, the lower end defining a peripheral rim with a diameter greater than a diameter of the second enclosure hood at its closed upper end; and
wherein the pressure of the gas supply forms a second gas pocket within the interior volume of the second enclosure hood, the second gas pocket extending from the second tube outlet to the peripheral rim of the second enclosure hood such that portions of the second gas pocket pass over the peripheral rim and form gas bubbles which rise through the mixture towards the open upper end of the tank.

14. The system of claim 13, wherein the diameter of the peripheral rim of the second enclosure hood is less than the diameter of the peripheral rim of the first enclosure hood.

15. The system of claim 1, further comprising a mixer at least partially disposed in the tank, the mixer defining an interior space having mixer section and a diffusion section, and wherein the interior space communicates with a sludge inlet tube through which the mixture of paint and liquid is delivered to the mixer, an outlet of the sludge inlet tube disposed in the mixer section of the mixer.

16. The system of claim 15, wherein the diffusion section is positioned vertically above the mixer section.

17. The system of claim 15, wherein a cross-sectional area of the mixer section varies along the vertical axis.

18. The system of claim 15, wherein the mixer section includes a mixer pocket in an area immediately adjacent the outlet of the sludge inlet tube, the mixer pocket having a greater cross-sectional area along its height than a cross-sectional area of the remainder of the mixer section.

19. The system of claim 15, wherein a bottom wall of the mixer is curved.

20. The system of claim 15, wherein a bottom wall of the mixer is flat and extends generally perpendicular to the vertical axis.

21. A system for paint sludge separation comprising:
a series of tanks having at least a first tank and a second tank, each tank defining a vertical axis and having an open upper end for moving paint sludge out of the respective tank;
a fluid conduit connecting an outlet of the first tank to an inlet of the second tank, the first tank receiving a mixture of paint and liquid from a painting operation;
a collecting pan having first and second openings receiving the first and second tanks therethrough, the collecting pan sloped relative to the vertical axes of the first and second tanks an configured to collect paint sludge flow out of the open upper ends of the first and second tanks;
each tank including a sparger comprising a gas inlet tube fluidically connected to an enclosure hood, the inlet tube projecting downwardly into the tank to a tube outlet, the enclosure hood having a closed upper end that radially encloses the tube outlet, the enclosure hood extending downwardly to an open lower end to define an interior volume between the upper and lower ends, the lower end defining a peripheral rim with a diameter greater than a diameter of the enclosure hood at the closed upper end, the enclosure hood being located in a middle or upper half of each tank; and
a gas supply feeding the gas inlet tube of each sparger, the gas supply having a pressure that forms a gas pocket within the interior volume of the enclosure hood that extends from the tube outlet to the peripheral rim such that portions of the gas pocket pass over the peripheral rim and form gas bubbles which rise through the mixture towards the open upper end of the tank.

22. The system of claim 1, wherein the open lower end of the enclosure hood is open and unobstructed to a bottom of the tank.

23. The system of claim 1, wherein the peripheral rim of the open lower end is located at an outermost diameter of the enclosure hood, the portions of the gas pocket leaving the interior volume as the portions pass over the peripheral rim.

* * * * *